United States Patent
Dubin et al.

(10) Patent No.: US 11,015,129 B2
(45) Date of Patent: May 25, 2021

(54) NAPHTHA HYDROTREATING PROCESS

(71) Applicant: AXENS, Rueil Malmaison (FR)

(72) Inventors: Geoffrey Dubin, Houston, TX (US);
Annick Pucci, Rueil-Malmaison (FR);
Boris Hesse, Rueil-Malmaison (FR)

(73) Assignee: AXENS, Rueil Malmaison (FR)

( * ) Notice: Subject to any disclaimer, the term of this patent is extended or adjusted under 35 U.S.C. 154(b) by 0 days.

(21) Appl. No.: 16/845,118

(22) Filed: Apr. 10, 2020

(65) Prior Publication Data
US 2020/0325404 A1    Oct. 15, 2020

(30) Foreign Application Priority Data

Apr. 12, 2019 (FR) ..................... 1903928

(51) Int. Cl.
| | | |
|---|---|---|
| C10G 45/08 | (2006.01) | |
| C10G 65/04 | (2006.01) | |
| B01J 8/04 | (2006.01) | |
| C10G 45/38 | (2006.01) | |

(52) U.S. Cl.
CPC ............ *C10G 45/08* (2013.01); *B01J 8/0453* (2013.01); *C10G 45/38* (2013.01); *C10G 65/04* (2013.01); *C10G 2300/1044* (2013.01); *C10G 2300/202* (2013.01); *C10G 2300/308* (2013.01); *C10G 2300/4018* (2013.01); *C10G 2300/70* (2013.01)

(58) Field of Classification Search
USPC ......... 208/210; 585/275, 418; 422/600, 630, 422/634, 651
See application file for complete search history.

(56) References Cited

U.S. PATENT DOCUMENTS

| | | | |
|---|---|---|---|
| 3,563,887 A | | 2/1971 | Fraser et al. |
| 5,290,427 A | * | 3/1994 | Fletcher ................. C10G 69/08 208/212 |

(Continued)

FOREIGN PATENT DOCUMENTS

| | | | | |
|---|---|---|---|---|
| CA | 2540517 A1 | * | 3/2006 | ........... C07D 487/04 |
| EA | 000485 B1 | * | 8/1999 | |
| EP | 2878651 | * | 3/2016 | |

OTHER PUBLICATIONS

English Translation EP 2878651 Patent (Year: 2015).*

(Continued)

*Primary Examiner* — Nina Bhat
(74) *Attorney, Agent, or Firm* — Millen White Zelano and Branigan, PC; Csaba Henter

(57) ABSTRACT

A naphtha hydrotreating process containing
a first step in the presence of the first catalyst containing a support;
a second step in the presence of the second catalyst containing a support and an active phase, which active phase contains a Group 9 or 10 metal and a Group 6 metal;
a third step in the presence of the third catalyst containing a support and an active phase, which active phase contains a Group 6 metal;
wherein
the content of Group 6 metal of the third catalyst is less than the content of Group 6 metal of the second catalyst;
the ratio of the loaded specific surface area of the first catalyst to that of the second catalyst is greater than or equal to 1.20;
the ratio of the loaded specific surface area of the third catalyst to that of the second catalyst is greater than 1.07.

19 Claims, 1 Drawing Sheet

(56) References Cited

U.S. PATENT DOCUMENTS

| | | | |
|---|---|---|---|
| 7,229,548 B2* | 6/2007 | Riley | B01J 23/85 |
| | | | 208/113 |
| 9,303,218 B2* | 4/2016 | Ellis | C10G 45/08 |
| 10,046,317 B2* | 8/2018 | Zhang | B01J 37/0201 |
| 2005/0284799 A1* | 12/2005 | Bauer | B01J 23/74 |
| | | | 208/213 |
| 2007/0102321 A1* | 5/2007 | Wang | C10G 47/16 |
| | | | 208/120.1 |
| 2007/0102322 A1* | 5/2007 | Wang | B01J 37/26 |
| | | | 208/120.1 |
| 2008/0004476 A1 | 1/2008 | Himelfarb et al. | |
| 2016/0075955 A1 | 3/2016 | Candelon et al. | |
| 2018/0171243 A1* | 6/2018 | Koseoglu | B01J 35/1042 |

OTHER PUBLICATIONS

English Translation EA 000485 Patent (Year: 1999).*
Search Report dated Nov. 11, 2019 issued in corresponding FR 1903928 application (2 pages).

* cited by examiner

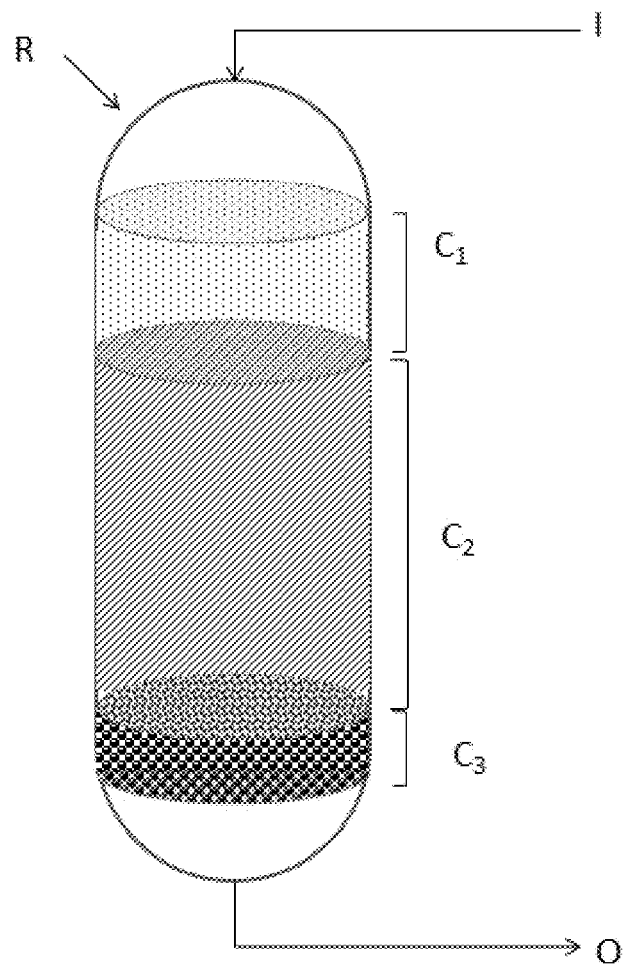

NAPHTHA HYDROTREATING PROCESS

TECHNICAL FIELD

The present invention relates to a process and a unit for the hydrotreating of a hydrocarbon-based feedstock such as a naphtha. More particularly, the present invention relates to a process for the hydrotreating of a naphtha feedstock using one or more reactors functioning under heterogeneous catalysis in a fixed bed comprising at least three catalytic layers.

PRIOR ART

In order to be competitive, a naphtha hydrotreating process must ensure a high degree of desulfurization, of olefin hydrogenation and of removal of any impurities that may be contained in the feedstock.

The residual sulfur-based compounds in naphtha after desulfurization by catalysis comprise recombination mercaptans, originating from the reaction of the $H_2S$, formed during the reaction, with the unreacted olefins of the feedstock or the olefins formed during the hydrotreating process. Furthermore, certain impurities such as silicon may accumulate in the catalytic beds and end up by poisoning said beds.

Patent FR2872516 describes a process for desulfurizing gasolines comprising olefins. The process is intended to minimize the content of compounds that are the most refractory with respect to hydrodesulfurization, such as recombination mercaptans and thiophene compounds, resulting from the addition of $H_2S$ to olefins while at the same time limiting the degree of olefin hydrogenation. The process comprises at least two steps: a first step of hydrodesulfurization A which is followed by a second step B, so that the catalyst of step B has catalytic activity for thiophene conversion of between 1% and 50% of the activity of the catalyst of step A.

U.S. Pat. No. 4,446,005 describes a process which comprises, in combination, the hydrotreating of naphtha, a sulfur trap and a reforming unit. A naphtha hydrotreating step located upstream of the reforming unit is used to treat a naphtha containing sulfur to remove the majority of the sulfur. A sulfur trap containing a nickel catalyst is used, downstream of said hydrotreating step, on the partially desulfurized naphtha line to remove the sulfur from the naphtha. A final protection bed is located downstream of, and in series with, the sulfur trap containing a nickel catalyst to remove the organo-sulfur-nickel complex formed in the sulfur trap containing a nickel catalyst in the case of dysfunction of the naphtha hydrotreating unit.

The object of the invention is to provide an improved naphtha hydrotreating process while at the same time prolonging the service life of the hydrotreating catalyst.

SUMMARY OF THE INVENTION

The process according to the invention is a naphtha hydrotreating process, using at least three catalysts. Each of said catalysts is characterized by its "loaded specific surface area", denoted by $L_1$, $L_2$ and $L_3$, respectively, corresponding to its specific surface area by mass multiplied by its loaded density. The process comprises three successive steps:
- a first step a) in the presence of the first catalyst, said first catalyst comprising a support and optionally an active phase, said active phase (which is thus optional) containing at least one Group 6 metal and optionally at least one Group 9 or 10 metal;
- a second step b) in the presence of the second catalyst, said second catalyst comprising a support and an active phase, said active phase containing at least one Group 9 or 10 metal and at least one Group 6 metal;
- a third step c) in the presence of the third catalyst, said third catalyst comprising a support and an active phase, said active phase containing at least one Group 6 metal and optionally at least one Group 9 or 10 metal;

such that:
- the content of Group 6 metal of the third catalyst is less than the content of Group 6 metal of the second catalyst;
- the ratio $L_1/L_2$ of the "loaded specific surface area" of said first catalyst to the "loaded specific surface area" of said second catalyst is greater than or equal to 1.20, preferably greater than or equal to 1.35;
- and the ratio $L_3/L_2$ of the "loaded specific surface area" of said third catalyst to the "loaded specific surface area" of said second catalyst is greater than 1.07, preferentially greater than or equal to 1.20, more preferentially greater than or equal to 1.35.

The "loaded specific surface area" of each catalyst is the multiplication of the specific surface area by mass of the catalyst by its loaded density. It is used to characterize the effective specific surface area available for the reaction in a given volume.

Unexpectedly, in contrast with the prior art, the process comprising three steps as described makes it possible, with a given volume of catalyst:
- to improve the performance of the hydrotreating process, which leads to a longer service life of the catalyst and, consequently, a reduced need to replace the catalyst of the naphtha hydrotreating process, which means an increased operating time;
- to reduce the amount of recombinant mercaptans, in particular in the third step;
- to trap a larger amount of impurities, in particular silicon and arsenic, in particular during the first and third steps.

These advantages are obtained by means of the synergism between the loaded specific surface area criteria and the metal content criteria of the catalysts in each of the three steps.

Advantageously, the active phase of the third catalyst contains at least one Group 9 or 10 metal so that the content of Group 9 plus 10 metal of the third catalyst is less than the content of Group 9 plus 10 metal of the second catalyst.

Advantageously, the liquid hourly space velocity of the first step is less than or equal to 20 times the overall liquid hourly space velocity, preferably less than or equal to 10 times and/or greater than or equal to 1.33 times, preferably greater than or equal to 1.66 times the overall liquid hourly space velocity.

Advantageously, the liquid hourly space velocity of the second step is less than or equal to 4 times the overall liquid hourly space velocity, preferably less than or equal to 2.5 times and/or greater than or equal to 1.33 times the overall liquid hourly space velocity.

Advantageously, the liquid hourly space velocity of the third step is greater than or equal to 5 times the overall liquid hourly space velocity, preferably greater than or equal to 6.66 times and/or less than or equal to 20 times, and preferably less than or equal to 14.29 times the overall liquid hourly space velocity.

Advantageously, the first and/or the third catalyst are at least partially supported on an alumina support. Preferably, the active phase contains molybdenum alone, or nickel and molybdenum, or cobalt and molybdenum, or nickel and cobalt and molybdenum.

Advantageously, the second catalyst is at least partially supported on an alumina support. Preferably, its active phase contains nickel and molybdenum, or cobalt and molybdenum, or nickel and cobalt and molybdenum.

Advantageously, the naphtha comprises hydrocarbons boiling in the naphtha range and comprises from 10 to 50 000 ppm by weight or by volume of one or more sulfur-based compounds.

Advantageously, the naphtha comprises a cracked naphtha feedstock, alone or as a mixture with other naphtha feedstocks. The improvement obtained by the process according to the invention relative to the prior art is even greater for feedstocks that are difficult to process such as cracked naphtha. The cracked naphtha feedstock typically comprises coker naphtha originating from a delayed coker unit.

In a first embodiment of the process according to the invention, the first catalyst comprises an active phase. Said active phase contains at least one Group 6 metal and preferably at least one Group 9 or 10 metal, so that the content of Group 6 metal of the first catalyst is less than or equal to the content of Group 6 metal of said second catalyst. The role of the Group 6 metal on the first catalyst is to equilibrate the activity of the first catalyst between the hydrogenation, hydrotreating and impurity removal reactions.

According to a first variant of the first embodiment, the active phase of the first catalyst contains at least one Group 9 or 10 metal, so that:
the content of Group 9 or 10 metal of said active phase of the first catalyst is greater than or equal to 0.5% by weight and less than 3% by weight;
the content of Group 9 plus 10 metal of said active phase of the first catalyst is less than the content of Group 9 plus 10 metal of said second catalyst.

In this first variant, the content of Group 6 metal of said first catalyst is preferably greater than or equal to 0.5% by weight and/or, preferably, less than or equal to 6% by weight.

In this first variant, the first step of the process has an activity that is well equilibrated between the hydrogenation, hydrotreating and impurity removal reactions, by means of the synergism between the content of Group 6 and of Group 9 or 10 metal of the active phase and the high "loaded specific surface area" of the first catalyst.

According to a second variant of the first embodiment, the active phase of the first catalyst contains at least one Group 9 or 10 metal, so that:
the content of Group 9 or 10 metal of said first catalyst is greater than or equal to 3% by weight and less than or equal to 9% by weight;
the content of Group 9 plus 10 metal of the first catalyst is greater than the content of Group 9 plus 10 metal of said second catalyst.

In this embodiment, the catalytic stack is suitable for treating "unconventional naphtha feedstocks" containing impurities such as arsenic and silicon.

In this second variant of the first embodiment, the content of Group 6 metal of said first catalyst is preferably greater than or equal to 6% by weight, more preferably greater than or equal to 7.5% by weight, and/or preferably less than or equal to 10% by weight, more preferably less than or equal to 9.5% by weight. In this case, the content of Group 6 metal of the first catalyst is suitable for treating "unconventional naphtha feedstocks". Such arrangements of feeds of Group 6 and of Group 9 or 10 metals make it possible to maintain high hydrogenation and desulfurization activity, even if the first catalyst is poisoned with the higher content of impurities present in the "unconventional naphtha feedstocks".

In a second embodiment of the process according to the invention, the first catalyst consists of a support without an active phase. The first catalyst is then suitable for removing impurities solely by means of the nature of its support. The manufacture of the first catalyst in this case does not require the impregnation of metal, which reduces the manufacturing cost and time.

In this second embodiment, the support for the first catalyst consists of a support without an active phase and without any Group 6, 9 or 10 metal. The support for the first catalyst may itself consist, at least partly, of a metal oxide such as alumina and may contain a very limited amount of metal, forming part of the impurities of the support, for example a total metal content of less than 50 ppm by weight.

In this second embodiment, the sum of the contents of Group 6 metal and of Group 9 or 10 metal of the first catalyst is less than or equal to 0.01% by weight, preferably less than or equal to 0.005% by weight.

The subject of the invention is also a naphtha hydrotreating process, comprising a naphtha hydrotreating process as described above, for producing a hydrodesulfurized naphtha, said process comprising one or more of the following preliminary steps:
an optional step of hydrogenation of the diolefins, producing a naphtha with a reduced content of diolefins;
one or more optional steps of separation and/or heating and/or cooling;
and one or more of the following additional steps:
a step of separation of at least part of the hydrodesulfurized naphtha to remove $H_2S$ and optional production of an LPG fraction and/or of an uncondensable stream;
an optional step of separating the hydrodesulfurized naphtha into at least two naphtha fractions.

The subject of the invention also relates to a naphtha hydrotreating unit that is suitable for performing the process described above, comprising a reaction section containing at least three catalysts, said catalysts being loaded onto first, second and third successive layers of catalyst and each of said catalysts being characterized by its "loaded specific surface area", denoted by $L_1$, $L_2$ and $L_3$, respectively, corresponding to its specific surface area by mass multiplied by its loaded density, said naphtha feedstock being successively placed in contact in said reaction section with:
the first layer of catalyst, said first catalyst comprising a support and optionally an active phase, said active phase containing at least one Group 6 metal and preferably at least one Group 9 or 10 metal;
the second layer of catalyst, said second catalyst comprising a support and an active phase, said active phase containing at least one Group 9 or 10 metal and at least one Group 6 metal;
the third layer of catalyst, said third catalyst comprising a support and an active phase, said active phase containing at least one Group 6 metal and optionally at least one Group 9 or 10 metal;
such that:
the content of Group 6 metal of the third catalyst is less than the content of Group 6 metal of the second catalyst;
the ratio $L_1/L_2$ of the "loaded specific surface area" of said first layer of catalyst to the "loaded specific surface area" of said second layer of catalyst is greater than or equal to 1.20, preferably greater than or equal to 1.35;

the ratio $L_3/L_2$ of the "loaded specific surface area" of said third layer of catalyst to the "loaded specific surface area" of said second layer of catalyst is greater than 1.07, preferably greater than or equal to 1.20, preferably greater than or equal to 1.35.

The naphtha hydrotreating unit according to the invention has the same advantages as those described for the naphtha hydrotreating process.

The naphtha hydrotreating unit is suitable for performing the process described above and all the embodiments thereof.

Advantageously, the first, second and third layers of catalyst are loaded into at least one reactor operating with a fixed catalytic bed and in axial flow, notably a single reactor.

According to a first embodiment of the unit, the three layers of catalysts are stacked in a single bed of catalyst.

According to a second embodiment of the unit, the three layers of catalysts are distributed between one or more reactors. Advantageously, a first fixed bed of catalyst in a first reactor contains the first layer of catalyst and a second fixed bed of catalyst in a second reactor contains the second and third layers of catalyst. In another example, the first reactor contains the first and second layers of catalyst and the second reactor contains the third layer of catalyst.

According to a third embodiment of the unit, at least one of the layers of catalyst is divided between two reactors. For example, a first fixed bed of catalyst in a first reactor contains the first and at least part of the second layer of catalyst and a second fixed bed in a second reactor contains the remaining amount of the second layer of catalyst and the third layer of catalyst.

According to another embodiment of the unit, each layer of catalyst is loaded into a separate reactor.

Advantageously, the volume of the first catalyst is less than or equal to 75% of the sum of the volume of the first, second and third catalysts, preferably less than or equal to 60% and/or greater than or equal to 5%, preferably greater than or equal to 10%.

Advantageously, the volume of the second catalyst is greater than or equal to 25% of the sum of the volume of the first, second and third catalysts, preferably greater than or equal to 40% and/or less than or equal to 75% of the sum of the volume of the first, second and third catalysts.

Advantageously, the volume of the third catalyst is greater than or equal to 5% of the total volume of the catalyst, preferably greater than or equal to 7% and/or less than or equal to 20% and preferably less than or equal to 15% of the sum of the volume of the first, second and third catalysts.

In one embodiment of the process and of the unit according to the invention, devoted to conventional feedstocks, the volume of the first catalyst may be greater than or equal to 5% and less than or equal to 60% of the total volume of catalyst, the volume of the second catalyst may be greater than or equal to 33% and less than or equal to 75% of the total volume of catalyst and the volume of the third catalyst may be greater than or equal to 5% and less than or equal to 15% of the total volume of catalyst.

In one embodiment of the process and of the unit according to the invention, devoted to unconventional naphtha, the volume of the first catalyst may be greater than or equal to 20% and less than or equal to 60% of the total volume of catalyst, the volume of the second catalyst may be greater than or equal to 33% and less than or equal to 66% of the total volume of catalyst and the volume of the third catalyst may be greater than or equal to 5% and less than or equal to 20% of the total volume of catalyst.

In another embodiment of the process and of the unit according to the invention, the first, second and third catalysts comprise an active phase containing at least one Group 6 metal.

Definitions

Throughout the present text, the indices of the layers of catalyst are ordered in the order of flow of the treated fluid.

Throughout the present text, the "successive steps" or "successive layers" mean that the effluent from one layer or from one step is passed to the next step or the next layer without intermediate reaction or separation or degassing of the effluent from the preceding layer or step. However, in order to adjust the temperature at the entry of a layer or of a step, or inside a layer of catalyst when so required, an optional vapour or liquid quench stream may be added to the effluent from the preceding step or layer, or inside the layer or the step, as required.

Throughout the present text, the density of a catalyst is defined as being the mass of catalyst per unit volume of catalyst. The "loaded density" of a catalyst corresponds to the mass of catalyst loaded into a volume per unit of said volume. It is calculated by dividing the mass of catalyst which was loaded into a volume by said volume. The "loaded density" may vary depending on the loading method used. When the catalyst is loaded without any control of its distribution, by gravity, its loaded density is less than the loaded density obtained when the catalyst is loaded into the same volume with a uniform and compact distribution, by using a dense loading device. For example, the loaded density of a catalyst of a given layer of catalyst in a reaction section corresponds to the mass of catalyst in said layer divided by the volume of said layer.

Throughout the present text, the specific surface area by mass of the catalyst is determined according to the standard ASTM D-3663. The specific surface area corresponds to a definition of SBET Brunauer-Emmett-Teller (BET) of a monolayer of $N_2$ adsorbed onto the surface of the catalyst by physisorption.

Throughout the present text, use is made of the "loaded specific surface area" criterion expressed in $m^2/m^3$. Said criterion is defined as being the loaded density (expressed in $kg/m^3$) multiplied by the specific surface area of the catalyst expressed in $m^2/kg$. This criterion is written in the form $L_n$, where n is the index of the corresponding layer of catalyst.

Throughout the present text, the ratio of the "loaded specific surface area" of two successive layers of catalyst is written, for example, as $L_{n+1}/L_n$ corresponding to the ratio of the "loaded specific surface area" for the catalysts of layer n and of layer n+1. Advantageously, this criterion is greater than or equal to 0.5 and/or less than or equal to 3.

Throughout the present text, all the contents of metals are expressed on a weight basis in oxide form. For a calcined catalyst, the weight content of metal in oxide form corresponds to the content of metal oxide on the catalyst itself. For a catalyst containing a booster additive, the metal by weight in oxide form corresponds to the content of metal oxide of the precursor of the catalyst (the support after impregnation of metal salts) after a calcination step.

Throughout the present text, the content of metal on the catalyst does not take into account the metal which may be present as minor impurities in the catalyst.

Throughout the present text, a "conventional naphtha feedstock" denotes a naphtha feedstock having a limited content of impurities, such as, typically, a sulfur content of between 10 ppm and 5000 ppm. Typically, a straight-run naphtha originating from an atmospheric distillation of crude oil is a conventional naphtha feedstock.

Throughout the present text, an "unconventional naphtha feedstock" denotes a naphtha feedstock which requires particularly harsh operating conditions, on account of its composition or of the nature and/or content of its impurities. Typically, these naphthas originate from hydrocarbon treatment units, for example catalytic and/or thermal and/or biological treatment units.

Throughout the present text, the groups of chemical elements are described according to the new IUPAC classification. For example, Groups 9 or 10 correspond to the metals of columns 9 and 10 according to the IUPAC classification or to the last two columns of Groups VIIIB according to the CAS classification (CRC Handbook of Chemistry and Physics, CRC editor press, chief editor D. R. Lide, 81st edition, 2000-2001). Similarly, Group 6 corresponds to the metals of column 6 according to the IUPAC classification or to the metals of columns VIB according to the CAS classification.

Throughout the present text, the weighted average bed temperature (WABT) is the average temperature over the total height of the bed. The "weighted average bed temperature", "start of run" or "WABT SOR" corresponds to the WABT at the start of the catalyst loading run and the "weighted average bed temperature", "end of run" or "WABT EOR" corresponds to the temperature at the end of the catalyst loading run.

Feedstocks:

Typical naphtha feedstocks used in the present invention may be a naphtha derived from crude atmospheric distillation (straight-run naphtha) and/or a naphtha from a thermal cracking unit, and/or a naphtha from a catalytic cracking unit, and/or a naphtha from a hydroconversion unit, and/or a naphtha from a hydrotreating unit, and/or from a biomass conversion unit or a naphtha from an oligomerization unit, alone or in the form of a mixture.

Typically, the naphtha used in the present invention contains 10 to 50 000 ppm by weight of sulfur, included in the form of one or more sulfur-based compounds, in particular in the form of mercaptans such as butyl mercaptan, of thiophenes, of alkylthiophenes, such as 2,5-dimethylthiophene, and of sulfides, such as ethyl methyl sulfide. The naphtha may also contain olefins and other unsaturated compounds, and also compounds based on other heteroatoms, such as nitrogen and oxygen. Furthermore, the naphtha may also contain traces of metals (As, Pb).

Advantageously, the naphtha feedstock used in the present invention may contain straight-run naphthas, which typically contain between 10 ppm and 5000 ppm by weight of sulfur.

Advantageously, the naphtha feedstock used in the present invention may be at least partially or totally naphtha feedstocks from a coker unit containing a high content of sulfur (typically from 1000 to 50 000 ppm by weight), a high content of nitrogen (typically from 20 to 200 ppm by weight), a high content of aromatics (typically from 15% to 25% by volume), a high content of unsaturated compounds (typically from 30% to 60% by volume) and other impurities such as silicon which is a poison for hydrotreating catalysts (typically from 1 to 15 ppm by weight) and arsenic. Coker units, such as delayed coker units, are used in refineries for cracking heavy residues, for instance vacuum gas oil, and/or vacuum residuum from vacuum distillation, and lighter distillates (naphtha, diesel, gas oil), and for simultaneously producing petroleum coke. Silicon and arsenic typically originate from the crude oil itself or from the antifoam used, which decomposes in the coker unit. Silicon and arsenic compounds are poisons for the hydrotreating catalysts used in naphtha hydrotreatings and also for the catalysts used in the units operating downstream of a naphtha hydrotreating. The removal of silicon and arsenic from naphtha is necessary to protect the downstream units. Consequently, the naphtha feedstocks of a coker unit require particularly harsh operating conditions to meet the rigorous specifications of the feeds for the downstream units. The three steps of the present invention make it possible to meet these particularly rigorous specifications and to treat up to 100% of coker unit naphtha with better performance than the processes of the prior art.

Advantageously, the naphtha feedstock for use in the present invention may be at least partially or totally naphtha originating from a unit for upgrading heavy residues such as a boiling-bed hydrocracker or a visbreaking unit. These naphthas may be as difficult to hydrotreat as coker unit naphthas. The three steps of the present invention make it possible, in a similar manner to the coker unit naphtha feedstocks, to meet these particularly rigorous specifications and to treat these feedstocks with better performance than in the processes of the prior art.

Hydrotreating

The hydrotreating process is typically used in a refinery to remove the components that are impurities for the downstream processes or products. The main reactions in naphtha hydrotreatings are hydrodesulfurization, hydrodenitrification and hydrogenation to produce a hydrotreated naphtha, a low amount of combustible gas and, optionally, a liquefied petroleum gas (LPG) light fraction. The feedstock, preferably in vapour phase, is placed in contact with a hydrotreating catalyst in the presence of hydrogen in at least one hydrotreating reactor.

The hydrotreating reactions convert sulfur-based compounds into hydrogen sulfide, remove the other heteroatoms and hydrogenate the unsaturated compounds.

The sulfur and nitrogen contents of the hydrotreated naphtha are typically between 0.1 and 1.0 ppm by weight of sulfur, preferably less than or equal to 0.5 ppm by weight of sulfur and between 0.1 and 1.0 ppm by weight of nitrogen, preferably less than or equal to 0.5 ppm by weight of nitrogen, depending on the destination of the hydrotreated naphtha or of its fractions.

Typically, a naphtha hydrotreating unit comprises a reaction section generally comprising a feedstock flask, one or more feedstock/effluent heat-exchange systems, an oven, at least one reactor functioning with a fixed catalytic bed and at least one separating flask.

In the present invention, the fixed catalytic bed in a hydrotreating reactor may comprise several additional layers of catalyst as follows:

at the top of the bed, one or more optional layers of porous elements of several sizes, intended for scavenging solid impurities present or created at the start of the bed; or, alternatively, one or more layers of inert gradings having decreasing sizes;

one or more layers of active gradings with a small content of impregnated metals. Said gradings have a reduced catalytic function, in particular as regards the hydrogenation of unsaturated compounds. Said gradings differ from the catalysts themselves by reduced hydrotreating activity and/or a form different from that of the catalyst (for example corrugated rings) and/or a lower content of impregnated metal and/or a lower specific surface area and a much thinner layer than a layer of catalyst;

the main bed of catalyst comprising the three layers of hydrotreating catalyst: a first layer of catalyst, a second layer of catalyst and a third layer of catalyst. These three layers constitute the main part of the fixed catalytic bed;

at the base of the bed, one or more layers of inert compounds before the outlet collecting device to prevent the catalyst from migrating out of the reactor.

Typically, in the present invention, the first step in the presence of the first catalyst is used to scavenge and treat the main impurities of the feedstock, such as arsenic and silicon, in particular in the case of a highly contaminated feedstock, and also to start the hydrogenation of unsaturated compounds that may be present in the feedstock. The second step in the presence of the second catalyst is used to hydrodesulfurize and to hydrotreat the feedstock. The third step in the presence of the third layer of catalyst is aimed at finishing the sulfur specification and trapping the silicon and arsenic.

In the present invention, the steps of the hydrotreating process are performed successively in the presence of the first, second and third catalysts on the main catalytic bed. The main catalytic bed does not comprise any of the layers of porous elements and/or of the inert compounds and/or of the active gradings located upstream or downstream of the main bed and mentioned above.

Means for reducing the temperature of the catalytic bed, for example liquid or gaseous coolant fluids (quenches), may optionally be provided in the process and/or in the reactor to regulate the operating temperature at the inlet of each layer of catalyst, or inside a layer of catalyst if necessary, so as to regulate the operating temperature during the hydrotreating step.

Before the hydrotreating reactor or process, a reactor or a step for removing the dienes may be used to reduce the diolefin content of the feedstock by at least 50%, preferably by at least 80% and more preferably by at least 90%. The removal of the dienes is performed conventionally in a dedicated reactor at a relatively low temperature.

The naphtha hydrotreating according to the invention typically takes place at a temperature of between 200° C. and 400° C., preferably between 260 and 360° C., with an operating pressure of between 0.5 MPa and 7 MPa, preferably between 1.5 MPa and 6 MPa. The liquid hourly space velocity (defined as being the standard volume of liquid feedstock per hour per volume of catalyst) is typically between 0.5 and 15 hours$^{-1}$, preferably between 1 and 8 hours$^{-1}$. The amount of hydrogen recycled relative to the naphtha feedstock is generally between 50 and 1000 Nm$^3$/m$^3$.

Advantageously, for "conventional" naphtha feedstocks, the liquid hourly space velocity is preferably between 3 and 10 hours$^{-1}$, preferably between 3 and 8 hours$^{-1}$.

Advantageously, for "unconventional" naphtha feedstocks, the liquid hourly space velocity is preferably between 0.5 and 8 hours$^{-1}$.

Properties of the Catalyst:

Advantageously, the hydrotreating catalyst includes a support chosen from alumina, silica, silica-alumina or titanium or magnesium oxides, used alone or as a mixture. Preferably, the hydrotreating catalyst includes an alumina support.

In the process according to the invention, the second catalyst is chosen from catalysts with an active phase comprising at least one metal chosen from Group 9 or 10 elements and at least one metal chosen from Group 6 elements.

In a first embodiment of the invention, the first catalyst is preferably chosen from catalysts comprising an active phase with at least one Group 6 metal and preferably at least one Group 9 or 10 metal.

In a second embodiment of the invention, the first catalyst does not contain any active phase. In this case, the first catalyst consists of a support preferably chosen from alumina and silica-alumina.

The third catalyst is preferably chosen from catalysts comprising an active phase comprising at least one Group 6 metal and optionally at least one Group 9 or 10 metal.

Depending on the nature of the feedstock and the specification of the product to be achieved, the first and the third catalyst may be the same catalyst or they may be different catalysts.

The at least one Group 6 metal may be, for example, molybdenum or tungsten. The at least one Group 9 or 10 metal may be, for example, nickel or cobalt.

Advantageously, the catalysts used for the first and third catalysts are catalysts with molybdenum alone, or nickel and molybdenum or cobalt and molybdenum or nickel and cobalt and molybdenum.

Advantageously, the catalysts used for the second catalyst are catalysts with nickel and molybdenum or cobalt and molybdenum or nickel and cobalt and molybdenum.

Advantageously, catalysts with 0.5% to 10% by weight of nickel (expressed as nickel oxide NiO) and/or with 1% to 30% by weight of molybdenum, preferably from 5% to 20% by weight of molybdenum (expressed as molybdenum oxide MoO3) may be used for the first, second and third catalysts. The total content of oxides of Groups 6 and/or 9 and/or 10 metals in each of the catalysts is generally greater than or equal to 5% by weight, preferably greater than or equal to 7% by weight and/or less than or equal to 40% by weight, preferably less than or equal to 30% by weight.

Advantageously, the catalysts may also contain a promoter element such as phosphorus and/or boron. These elements may be introduced into the matrix or, rather, impregnated onto the support. Silicon may also be placed on the support, alone or in combination with phosphorus and/or boron. The concentration of said promoter element is generally less than 20% by weight and usually less than 10%.

Advantageously, the catalyst, in particular the second and/or third catalysts, may also contain a booster additive leading to better dispersion and promotion of the active phase of the catalyst, so as to improve its activity. Said booster additive is typically an organic compound containing oxygen and/or nitrogen, chosen from a carboxylic acid, an alcohol, an aldehyde and an ester. A catalyst containing a booster additive is typically prepared via a process comprising a step of impregnating a support with metal salts, in ranges such as those described for the catalyst without booster additive, leading to a catalyst precursor. Next, the catalyst precursor undergoes a step of impregnation with the booster additive, followed by a step of drying at a temperature below 200° C., without consecutive calcination thereof. Consequently, the catalyst containing a booster additive is composed of a support, optionally a promoter element, an active phase and an organic compound containing oxygen or nitrogen. During the preparation process, a catalyst containing a booster additive does not undergo calcination, i.e. its active phase comprises metals, for example Group 6 and/or Group 9 or 10 metals, which have not been transformed into oxide form.

In the present text, all the contents of metals are expressed in oxide form. To evaluate the content of metal expressed in oxide form of a catalyst containing a booster additive, its corresponding catalyst precursor must be calcined, which leads to a metallic form of metal oxides which are comparable to that of the catalyst without additive. When the catalyst containing a booster additive is placed in operation and heated, the booster additive is removed from the catalyst. A person skilled in the art thus evaluates the amount of booster additive by using the loss on ignition of the catalyst.

Consequently, in the present text, when a catalyst contains a booster additive, the loaded density of said catalyst in a given layer of catalyst of a reaction section corresponds to the mass of said catalyst in said layer minus its loss on ignition expressed as mass divided by the volume of said layer.

The catalysts are typically used in a hydrotreating process in a sulfurized form obtained after high-temperature treatment on contact with a sulfur-based organic compound which can decompose into $H_2S$ or directly in contact with a gaseous stream of $H_2S$ diluted in hydrogen. This step may be performed in situ or ex situ of the hydrotreating reaction section (inside or outside the reactor) at temperatures of between 180 and 600° C. and more preferably between 200 and 400° C.

Advantageously, the loaded density of the first, second and third catalysts is greater than or equal to 400 kg/m$^3$, preferably greater than or equal to 450 kg/m$^3$, and preferably less than or equal to 900 kg/m$^3$, more preferably less than or equal to 850 kg/m$^3$.

Advantageously, the specific surface area of the first and third catalysts is greater than or equal to 240 m$^2$/g, preferably greater than or equal to 270 m$^2$/g, and preferably less than or equal to 380 m$^2$/g, more preferably less than or equal to 350 m$^2$/g.

Advantageously, the specific surface area of the second catalyst is greater than or equal to 120 m$^2$/g, preferably greater than or equal to 130 m$^2$/g, and less than or equal to 260 m$^2$/g, preferably less than or equal to 250 m$^2$/g.

Advantageously, the total content of metals of the third catalyst is between 0.7 and 1.25 times and preferably between 0.8 and 1.2 times the total content of metals of the first catalyst.

Advantageously, the first, second and third catalysts may have a total pore volume, measured by mercury porosimetry, of greater than or equal to 0.3 cm$^3$/g, preferably greater than or equal to 0.4, more preferably greater than or equal to 0.5 and less than or equal to 1.3 cm$^3$/g.

Advantageously, the first, second and third catalysts may have a total pore volume, measured by mercury porosimetry, of less than or equal to 1.4 cm$^3$/g, preferably less than or equal to 1.3 cm$^3$/g. The total pore volume measured by mercury porosimetry is determined according to the standard ASTM D4284-92 by considering a wetting angle of 140° with a device equivalent to the Autopore III machine sold by Micromeritics.

A person skilled in the art knows that the properties of each of the catalysts can fluctuate slightly over the thickness of each layer on condition that the properties of the layer of catalyst are overall equivalent to the characteristics of the catalyst in terms of loaded density, metal content and specific surface area.

The first, second and third layers of catalyst may comprise partially regenerated catalysts.

LIST OF FIGURES

FIG. 1 represents an embodiment of a hydrotreating reactor R which may be used in the unit and/or the process according to the invention.

DESCRIPTION OF THE EMBODIMENTS

As shown in the FIGURE, the hydrotreating reactor R was loaded using a dense loading device with three layers of catalyst: a first layer of first catalyst $C_1$, a second layer of second catalyst $C_2$ and a third layer of third catalyst $C_3$. The layers of inert or active grading upstream or downstream of the layers of catalyst are not shown. The hydrotreating reactor R is run in descending flow with a naphtha feedstock fed via an inlet line I at the top of the reactor and collected at the reactor outlet via an outlet line O.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1903928, filed Apr. 12, 2019 are incorporated by reference herein.

EXAMPLES

Naphtha hydrotreating catalysts supported on alumina having the following properties are used in the examples. All the catalysts are loaded without any control of their distribution (sock-loaded).

Table 1 below indicates the properties of the hydrotreating catalysts used.

| Name | Type | Specific surface area by mass (m$^2$/g) | Ni content (weight %) | Mo content (weight %) | Loaded specific surface area (10$^6$m$^2$/m$^3$) |
|---|---|---|---|---|---|
| A | Calcined | 175 | 4.0 | 15.5 | 128 |
| B | Calcined | 280 | 2.4 | 9.5 | 176 |
| C | Calcined | 230 | 1.8 | 6.9 | 113 |
| D | Calcined | 320 | 0.9 | 3.5 | 176 |
| E | With booster additive | 155 | 4.2 | 18.0 | 127 |
| F | Calcined | 248 | 8.2 | 7.0 | 154 |
| G | Calcined | 320 | 0 | 3.5 | 176 |
| H | Calcined | 290 | 0 | 0 | 206 |
| K | Calcined | 180 | 3.2 | 13.5 | 122 |
| L | With booster additive | 165 | 2.4 | 9.5 | 132 |

For all the examples, the targeted specifications for the hydrotreated naphtha are 0.5 ppm by weight of sulfur and 0.5 ppm by weight of nitrogen.

Example 1

A coker naphtha feedstock of a delayed coker unit is treated in a first stage in order to hydrogenate all of its diolefins and is then sent to the naphtha hydrotreating unit. The feedstock requires harsh hydrotreating conditions on account of its composition and also of the nature and type of its impurities.

Table 2 below indicates the properties of the feedstock 1.

|  | Coker naphtha feedstock |
|---|---|
| Density, kg/m$^3$ | 750 |
| Sulfur content, weight % | 1.0 |
| Nitrogen content, ppm by weight | 150 |
| Bromine number, g/100 g | 75 |
| Maleic anhydride value, mg of maleic anhydride/g | 4 |
| Silicon content, ppm by weight | 4 |

The naphtha hydrotreating of feedstock 1 having the properties described in Table 2 (downstream of the removal of diolefins) is simulated considering several configurations of catalytic bed in a hydrotreating reactor under the conditions described in Table 3, which indicates the properties of the catalytic bed configurations:

TABLE 3

|  | Catalyst load 1 (comparative) | | Catalyst load 2 (invention) | | Catalyst load 3 (comparative) | | Catalyst load 4 (invention) | |
|---|---|---|---|---|---|---|---|---|
|  | Catalyst | Volume (volume %) | Catalyst | Volume (volume %) | Catalyst | Volume (volume %) | Catalyst | Volume |
| Bed 1 | B | 50% | B | 50% | K | 50% | B | 50% |
| Bed 2 | A | 50% | A | 40% | A | 40% | A | 40% |
| Bed 3 |  |  | D | 10% | D | 10% | G | 10% |
| LHSV (h$^{-1}$) |  | 2.0 |  | 2.0 |  | 2.0 |  | 2.0 |
| Partial pressure of hydrogen (MPa) |  | 4.0 |  | 4.0 |  | 4.0 |  | 4.0 |
| $L_1/L_2$ |  | 1.38 |  | 1.38 |  | 0.95 |  | 1.38 |
| $L_3/L_2$ |  | 1.00 |  | 1.38 |  | 1.38 |  | 1.38 |

The following simulation results are obtained as indicated in Table 4 below:

TABLE 4

|  | Catalyst load 1 (comparative) | Catalyst load 2 (invention) | Catalyst load 3 (comparative) | Catalyst load 4 (invention) |
|---|---|---|---|---|
| WABT, start of run (° C.) | 280 | 280 | 280 | 280 |
| WABT, end of run (° C.) | 310 | 330 | 330 | 325 |
| Service life of the catalyst load, % of the base case | Base | Base +34% | Base −20% | Base +20% |
| Silicon scavenged, kg | 4106 | 4194 | 3536 | 4194 |

As shown in Table 4, when the three catalysts used for the naphtha hydrotreating reaction are loaded according to the invention, as in the catalyst loads 2 and 4, the service life of the catalyst load is increased by 34% and 20%, respectively, relative to the comparative load with only two layers (catalyst load 1).

As shown in Table 4, not only do the catalyst loads 2 and 4 according to the invention make it possible to use the catalyst load for longer than the comparative load with only two layers, but also the catalyst can function at a higher WABT temperature, while at the same time maintaining its performance. Specifically, the WABT end of run is increased by 20° C. for load 2 and by 15° C. for load 4 relative to load 1.

The silicon scavenged during the service life of the catalyst load is increased by 88 kg for the loads 2 and 4 relative to the comparative load 1 with only two layers. Consequently, the silicon scavenging capacity of the catalyst loads according to the invention is increased so as to prevent the silicon from reaching the end of the run.

The comparative load 3 corresponds to a load in which the metal content criteria of the first, second and third catalysts are satisfied, but the ratio of the loaded specific surface areas $L_1/L_2$ is less than 1.20. The results indicate a 20% decrease in the service life of the catalyst load. Furthermore, the silicon scavenging capacity is reduced to 3536 kg/h instead of 4194 kg/h for the load according to the invention.

Example 2

A conventional naphtha feedstock consisting of a mixture of straight-run naphtha and of coker naphtha is sent to a naphtha hydrotreating unit. The feedstock does not require harsh hydrotreating conditions on account of its composition and also of the nature and type of its impurities.

Table 5 below indicates the properties of the feedstock 2.

|  | Naphtha feedstock 2 |
| --- | --- |
| Density, kg/m$^3$ | 750 |
| Sulfur content, weight % | 0.1 |
| Nitrogen content, ppm by weight | 10 |
| Bromine number, g/100 g | 8 |
| Anhydride value, mg of maleic anhydride/g | 2.5 |
| Silicon content, ppm by weight | 0.4 |

The naphtha hydrotreating of feedstock 2 having the properties described in Table 5 is simulated considering several configurations of catalytic bed in a hydrotreating reactor under the following conditions:

Table 6 below describes the properties of the four catalytic bed configurations.

|  | Catalyst load 5 (comparative) | | Catalyst load 6 (invention) | | Catalyst load 7 (invention) | | Catalyst load 8 (invention) | |
| --- | --- | --- | --- | --- | --- | --- | --- | --- |
|  | Catalyst | Volume (volume %) | Catalyst | Volume (volume %) | Catalyst | Volume (volume %) | Catalyst | Volume (volume %) |
| Bed 1 | D | 20 | D | 20 | G | 20 | H | 20 |
| Bed 2 | C | 75 | C | 75 | C | 75 | C | 75 |
| Bed 3 | C | 5 | D | 5 | D | 5 | D | 5 |
| LHSV (h$^{-1}$) | 10 | | 10 | | 10 | | 10 | |
| Partial pressure of hydrogen (MPa) | 1.0 | | 1.0 | | 1.0 | | 1.0 | |
| $L_1/L_2$ | 1.56 | | 1.56 | | 1.56 | | 1.82 | |
| $L_3/L_2$ | 1.00 | | 1.56 | | 1.56 | | 1.56 | |

The simulation results are obtained according to Table 7 below:

|  | Catalyst load 5 (comparative) | Catalyst load 6 (invention) | Catalyst load 7 (invention) | Catalyst load 8 (invention) |
| --- | --- | --- | --- | --- |
| WABT, start of run (° C.) | 270 | 270 | 275 | 285 |
| WABT, end of run (° C.) | 320 | 335 | 335 | 335 |
| Service life of the catalyst load, % of the base case | Base | Base +30% | Base +20% | Base +6% |
| Silicon scavenged, kg | 472 | 490 | 490 | 580 |

As shown in Table 7, when the three catalysts used for the naphtha hydrotreating reaction are loaded according to the invention, as in the catalyst loads 6, 7 and 8, the service life of the catalyst load is increased relative to the comparative load with only two layers (catalyst load 5), by 30%, 20% and 6%, respectively.

As shown in Table 7, not only does the catalyst load according to the invention make it possible to use the catalyst load for longer than the comparative load with only two layers, but also the catalyst can function at a higher WABT temperature, while at the same time maintaining its performance. Specifically, the WABT end of run is increased by 15° C. for loads 6, 7 and 8 relative to load 5.

Furthermore, the silicon scavenged during the service life of the catalyst load is increased by 18 kg relative to the comparative load 5 for loads 6 and 7, and by 108 kg for load 8. Consequently, the silicon scavenging capacity of the catalyst loads according to the invention is increased so as to prevent the silicon from reaching the end of the run.

The process according to the invention is still advantageous even when the feedstock to be treated does not require harsh hydrotreating conditions.

Example 3

A coker naphtha feedstock of a delayed coker unit having a high arsenic content is treated in a first stage in order to hydrogenate all of its diolefins and is then sent to the naphtha hydrotreating unit.

The feedstock requires harsh hydrotreating conditions to treat the simultaneous contamination with arsenic and silicon.

Table 8 below indicates the properties of the feedstock 3.

|  | Coker naphtha feedstock 3 |
| --- | --- |
| Density, kg/m$^3$ | 750 |
| Sulfur content, weight % | 1.0 |
| Nitrogen content, ppm by weight | 150 |
| Bromine number, g/100 g | 75 |
| Maleic anhydride value, mg of maleic anhydride/g | 4 |
| Silicon content, ppm by weight | 3 |
| Arsenic content, ppm by weight | 40 |

The naphtha hydrotreating of feedstock 3 having the properties described in Table 8 (but downstream of the removal of the diolefins) is simulated considering several configurations of catalytic bed in a hydrotreating reactor included in the reaction section of a hydrotreating unit.

Table 9 below indicates the properties of the three catalytic bed configurations.

|  | Catalyst load 9 (comparative) | | Catalyst load 10 (invention) | | Catalyst load 11 (comparative) | |
| --- | --- | --- | --- | --- | --- | --- |
|  | Catalyst | Volume (volume %) | Catalyst | Volume (volume %) | Catalyst | Volume (volume %) |
| Bed 1 | F | 20% | F | 20% | F | 20% |
| Bed 2 | E | 65% | E | 65% | E | 65% |
| Lit 3 | E | 15% | B | 15% | L | 15% |
| LHSV (h$^{-1}$) | 2.0 | | 2.0 | | 2.0 | |
| Partial pressure of hydrogen (MPa) | 4.0 | | 4.0 | | 4.0 | |
| $L_1/L_2$ | 1.21 | | 1.21 | | 1.21 | |
| $L_3/L_2$ | 1.00 | | 1.21 | | 1.04 | |

The simulation results obtained are indicated in Table 10 below:

|  | Catalyst load 9 (comparative) | Catalyst load 10 (invention) | Catalyst load 11 (comparative) |
| --- | --- | --- | --- |
| WABT, start of run (° C.) | 285 | 285 | 285 |
| WABT, end of run (° C.) | 310 | 330 | 325 |
| Service life of the catalyst load, % of the base case | Base | Base +1.3% | Base −0.3% |
| Silicon scavenged, kg | 2778 | 2815 | 2769 |
| Arsenic scavenged, kg | 34.7 | 35.2 | 34.6 |

As shown in Table 10, when the three catalysts used for the naphtha hydrotreating reaction are loaded according to the invention, as in the catalyst load 10, the service life of the catalyst load is increased by 1.3% relative to the comparative load (catalyst load 9 in which the second and third layers consist of the same catalysts).

As shown in Table 10, not only does the catalyst load 10 according to the invention make it possible to use the catalyst load for longer than the comparative load 9, but also the catalyst can function at a higher WABT temperature, while at the same time maintaining its performance. Specifically, the WABT end of run is increased by 20° C. for load 10 relative to load 9.

The silicon scavenged during the service life of the catalyst load is increased by 37 kg for the catalyst load 10 relative to the comparative load 9. The silicon scavenging capacity of the catalyst loads according to the invention is increased so as to prevent the silicon from reaching the end of the run.

The arsenic scavenged during the service life of the catalyst load is slightly improved relative to the comparative load 9.

The comparative load 11 corresponds to a load in which the metal content criteria of the first, second and third catalysts are satisfied, but the ratio of the loaded specific surface areas $L_3/L_2$ is less than 1.20. The results show a small decrease in the service life of the catalyst load (0.3%) and a relative decrease in the silicon scavenging capacity (−9 kg/h relative to the comparative load 9). In the comparative load 11, the amount of silicon scavenged is even slightly smaller than the amount scavenged with the comparative load 9 with only two layers.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A naphtha hydrotreating process performed in the presence of at least a first catalyst, a second catalyst and a third catalyst, each of said catalysts having a loaded specific surface area, $L_1$, $L_2$ and $L_3$, respectively, corresponding to the specific surface area by mass multiplied by the loaded density of the respective catalysts,
    said process comprising three successive steps through each of which the naphtha is passed through:
    a first step a) in the presence of the first catalyst having loaded specific surface area $L_1$, said first catalyst comprising a support and optionally an active phase, said active phase containing at least one Group 6 metal and optionally at least one Group 9 or 10 metal;
    a second step b) in the presence of the second catalyst having loaded specific surface area $L_2$, said second catalyst comprising a support and an active phase, said active phase containing at least one Group 9 or 10 metal and at least one Group 6 metal;
    a third step c) in the presence of the third catalyst having loaded specific area $L_2$, said third catalyst comprising a support and an active phase, said active phase containing at least one Group 6 metal and optionally at least one Group 9 or 10 metal;
    wherein a hydrotreated naphtha is produced, and
    wherein
    the content of Group 6 metal of the third catalyst is less than the content of Group 6 metal of said second catalyst;
    the ratio $L_1/L_2$ is greater than or equal to 1.20;
    the ratio $L_3/L_2$ is greater than 1.07.

2. The process according to claim 1, in which said first catalyst comprises an active phase,
    and wherein the content of Group 6 metal of said first catalyst is less than the content of Group 6 metal of said second catalyst.

3. The process according to claim 2, in which the active phase of the first catalyst contains at least one Group 9 or 10 metal,
    and wherein
    the content of Group 9 or 10 metal of said active phase of the first catalyst is greater than or equal to 0.5% by weight and less than 3% by weight;
    the content of Group 9 plus 10 metal of said active phase of the first catalyst is less than the content of Group 9 plus 10 metal of said second catalyst.

4. The process according to claim 2, in which the active phase of the first catalyst contains at least one Group 9 or 10 metal,
    and wherein
    the content of Group 9 or 10 metal of said first catalyst is greater than or equal to 3% by weight and less than or equal to 9% by weight;
    the content of Group 9 plus 10 metal of the first catalyst is greater than the content of Group 9 plus 10 metal of said second catalysts.

5. The process according to claim 1, in which said first catalyst consists of a support without an active phase.

6. The process according to claim 1, in which the active phase of the third catalyst contains at least one Group 9 or 10 metal,
    and wherein the content of Group 9 plus 10 metal of the third catalyst is less than the content of Group 9 plus 10 metal of said second catalyst.

7. The process according to claim 1, in which the liquid hourly space velocity of the first step is less than or equal to 20 times the overall liquid hourly space velocity and greater than or equal to 1.33 times the overall liquid hourly space velocity.

8. The process according to claim 1, in which the liquid hourly space velocity of the second step is less than or equal to 4 times the overall liquid hourly space velocity and greater than or equal to 1.33 times the overall liquid hourly space velocity.

9. The process according to claim 1, in which the liquid hourly space velocity of the third step is greater than or equal to 5 times the overall liquid hourly space velocity and less than or equal to 20 times the overall liquid hourly space velocity.

10. The process according to claim 1, in which the first or third catalyst contains molybdenum alone, or nickel and molybdenum, or cobalt and molybdenum, or nickel and cobalt and molybdenum.

11. The process according to claim 1, in which the second catalyst contains nickel and molybdenum, or cobalt and molybdenum, or nickel and cobalt and molybdenum.

12. The process according to claim 1, in which said naphtha comprises hydrocarbons comprising from 10 to 50 000 ppm by weight of one or more sulfur-based compounds.

13. The process according to claim 1, in which said naphtha comprises a cracked naphtha feedstock, alone or as a mixture with a different naphtha feedstock.

14. The naphtha hydrotreating process according to claim 1, which produces a hydrodesulfurized naphtha, further comprising
an optional step of hydrogenation of diolefins, producing a naphtha with a reduced content of diolefins;
a step of separation of at least part of the hydrodesulfurized naphtha to remove H₂S and optional production of an LPG fraction or of an unconsensable stream;
an optional step of separating the hydrodesulfurized naphtha into at least two naphtha fractions.

15. A naphtha hydrotreating reactor comprising a reaction section containing at least three catalysts, said catalyst being loaded onto first, second and third successive layers of catalyst and each of said catalysts having a loaded specific surface area $L_1$, $L_2$ and $L_3$, respectively, corresponding to its specific surface area by mass multiplied by its loaded density,
the first layer of catalyst contains the first catalyst comprising a support and optionally an active phase, said active phase containing at least one Group 6 metal and optionally at least one Group 9 or 10 metal;
the second layer of catalyst contains the second catalyst comprising a support and an active phase, said active phase containing at least one Group 9 or 10 metal and at least one Group 6 metal;
the third layer of catalyst contains the third catalyst comprising a support and an active phase, said active phase containing at least one Group 6 metal and optionally at least one Group 9 or 10 metal;
and wherein
the content of Group 6 metal of the third catalyst is less than the content of Group 6 metal of the second catalyst;
the ratio $L_1/L_2$ is greater than or equal to 1.20;
the ratio $L_3/L_2$ is greater than 1.07.

16. The naphtha hydrotreating reactor according to claim 15, which is a fixed catalytic bed reactor with axial flow.

17. The naphtha hydrotreating process according to claim 3, wherein the content of Group 6 metal of said first catalyst is greater than or equal to 0.5% by weight and less than or equal to 6% by weight.

18. The naphtha hydrotreating process according to claim 4, wherein the content of Group 6 metal of said first catalyst is greater than 6% by weight and less than or equal to 10% by weight.

19. The naphtha hydrotreating process according to claim 3, wherein the
the ratio $L_1/L_2$ is greater than or equal to 1.35; and
the ratio $L_3/L_2$ is greater than or equal to 1.35.

* * * * *